Nov. 25, 1969     J. J. SZANTO     3,480,035
VALVE CORE
Filed June 14, 1967
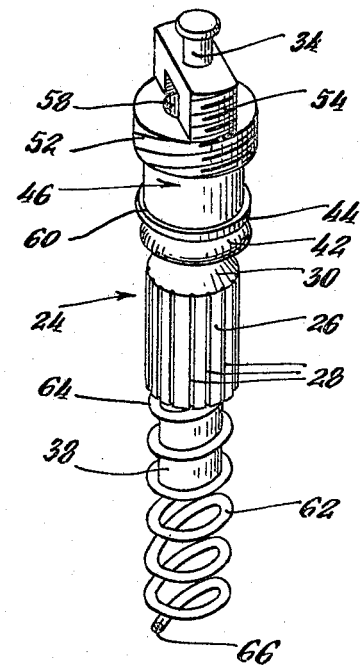
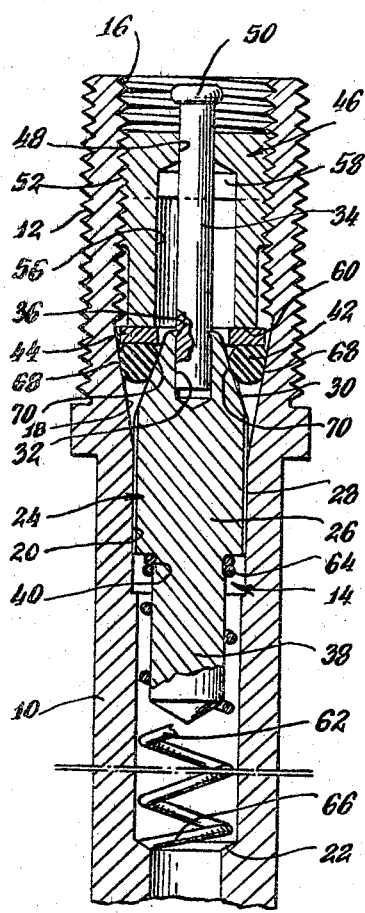
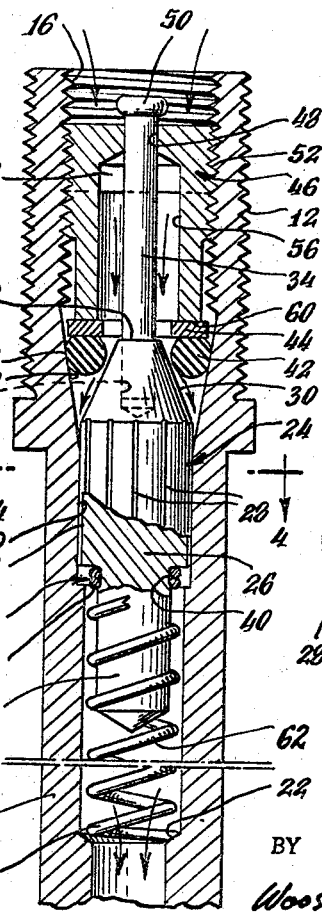
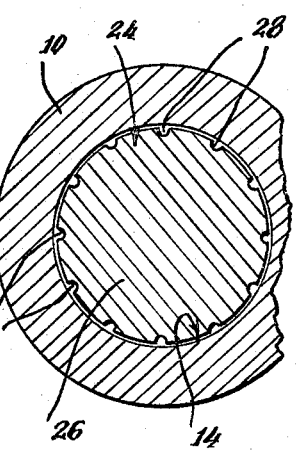
INVENTOR.
BY Joseph J. Szanto
Wooster, Davis & Cifelli
ATTORNEYS.

United States Patent Office 3,480,035
Patented Nov. 25, 1969

3,480,035
VALVE CORE
Joseph J. Szanto, Fairfield, Conn.
(8560 NW. 15th St., Pembroke Pines, Fla. 33024)
Filed June 14, 1967, Ser. No. 646,085
Int. Cl. F16k 15/20
U.S. Cl. 137—234.5
7 Claims

ABSTRACT OF THE DISCLOSURE

An improved valve core having a unitary sealing ring loosely encircling a conical valve seat, the sealing ring forming both the static and dynamic seals when the valve core is located in a valve stem.

BACKGROUND OF THE INVENTION

My invention relates to an improved valve core and more particularly to a core including a unitary sealing member having two points of sealing contact.

Valve cores of the type herein disclosed comprise the internal or sealing portion of the pneumatic inflation valves commonly used in automobile tires. Such valve cores must be constructed to prevent leakage of the pressurized gas from the pressure chamber to the atmosphere. The prior art forms generally comprise a static sealing element comprising a collar formed on the core body which may be positioned in place against a valve seat in the valve stem and a dynamic sealing element which is movable into and out of engagement with a stationary seat formed on the valve core.

Heretofore the valve core structures have been unsatisfactory in forming substantially airtight seals. While no leakage occurs around the static seal, the dynamic seals often break down in use due to the wearing away of the rubber sealing member against the usual metal seats. Furthermore, the effectiveness of the dynamic seal is often impaired by "cocking" of the sealing element with respect to the seat or the imbedment of dirt or grit particles in the sealing element. These conditions allow air leakage from the pressurized chamber. Further, the known valve core structures are generally constructed of a great many parts, thus requiring plural manufacturing and assembly operations with the attendant high percentage of rejected articles and high cost per article. Several of the most commonly used valve core structures are constructed of telescoping thin walled tubular elements which are particularly difficult to form as the walls have a tendency to rupture during the drawing operation or season crack during use. This type of core has the further disadvantage of being unable to withstand sudden shocks and increases in pressure due to the sudden impact of the automobile tire against a barrier such as a pothole.

SUMMARY OF THE INVENTION

Accordingly, it is the primary object of my invention to provide a valve core comprising a unitary self-aligning sealing ring having portions forming the static and the dynamic seals.

Another object is to provide an improved valve core in which the unitary sealing ring is positioned to prevent the accumulation of dirt particles at its dynamic sealing surface.

A further object of my invention is to provide an improved valve core which is pressure-tight, shock-resistant and economical to manufacture.

To accomplish these objects, in one form, I have provided an improved valve core which comprises a body having a conical valve seat at one end, an axial pin extending from the one end, a screw plug mounted for reciprocation on the pin and having an externally threaded portion and an enlarged axail bore, a sealing ring loosely encircling the pin and positioned between the conical valve body and the screw plug, and resilient biasing means secured to another end of the body.

BRIEF DESCRIPTION OF THE DRAWING

Other objects and further details of that which I believe to be novel and my invention will be clear from the following description and claims taken with the accompanying drawing, wherein:

FIG. 1 is an enlarged perspective view of my improved valve core;

FIG. 2 is a cross sectional view taken through the center of the valve core of FIG. 1 showing the valve in its sealing position;

FIG. 3 is a cross sectional view similar to that of FIG. 2 showing the valve in its open position; and FIG. 4 is a sectional view taken substantially along line 4—4 of FIG. 3 showing the grooves through which the gas may pass from the supply source to the pressure chamber.

DESCRIPTION OF THE PREFERRED EMBODIMENT

With particular reference to the drawing there is illustrated in FIGS. 2 and 3 a standard tubular valve stem 10 having at its upper end an externally threaded portion 12 and including an axial bore 14 defining an internally threaded portion 16, a tapered valve seat 18, a reduced diameter bore 20 and a shoulder 22 formed at the drill end point. The axial bore 16 communicates the atmosphere to a pressure chamber (not shown) and receives a valve core 24 constructed as shown in FIG. 1. The core comprises a generally cylindrical body 26 including a plurality of peripherally spaced axially extending grooves 28 disposed thereon, and having at one end a frusto-conical portion 30 which forms a needle valve as will become apparent. The frusto-conical portion is axially bored at 32 for receiving a portion of pin 34 therein, which pin may be secured in place by means of pinching the frusto-conical tip 36 or the pin 34 may be secured in some other suitable manner. Alternatively, the body 26 and pin 34 may be formed in one piece. The body 26 includes a reduced diameter portion 38 at its other end which portion 38 defines an undercut 40 at its upper end as viewed in FIGS. 2 and 3.

The sealing means of my invention comprises a standard O-ring 42 made of rubber or similar material and having an outer diameter slightly smaller than the thread diameter 16 for allowing the O-ring to pass freely into the valve stem and having an inner diameter approximately twice the diameter of the pin 34. The ring 42 loosely encircles a portion of the pin 34 and the frusto-conical portion 30. A friction washer 44 which also loosely encircles the pin 34 is placed adjacent the O-ring 42 and a standard screw plug 46, having a central axial opening 48 at one end for receiving the pin 34, is located at the end of the pin and is prevented from being removed by the spun-over end 50.

The standard screw plug 46 comprises a cylindrical member having an externally threaded portion 52 at one end thereof terminating in a keying bridge 54 which includes at its ends extensions of the external threads. The screw plug defines an axial bore 56 therein which communicates with the atmosphere through openings 58 formed at either side of the keying bridge 54 and at its end remote from the keying bridge, the plug 46 defines an annular shoulder 60.

A compression spring 62 having two or three reduced diameter windings 64 and a free end 66 may be slipped over the reduced diameter end 38 so that the windings 64 may drop into the undercut 40.

It should be noted that the assembly of the valve core is extremely simple and foolproof, requiring the assembler merely to place the O-ring 42, the friction washer 44 and the screw plug 46 upon the pin 34 in the manner of placing beads upon a string, spin over the pin at 50 and slip the spring 62 upon the other end of the body. Since the O-ring and the friction washer loosely encircle the pin, it is unnecessary to align them for proper sealing as they will automatically align themselves.

The valve core 24 may be inserted into the bore 14 of the valve stem 10 until the threaded portion 52 of the screw plug 46 engages the threaded portion 16 of the valve stem. The screw plug 46 is then rotated by means of a suitable tool which engages the keying bridge 54 until the O-ring 42 bears against the tapered valve seat 18 for forming the static sealing surface 68 between the valve core and valve stem. As the O-ring is formed of a resilient material which is easily deformable, a good seal is made at 68 even if tool marks or other irregularities are present on the tapered valve seat. It should be noted that the torsional force required for threadedly anchoring the screw plug 46 in the valve stem 10 is not transmitted directly to the O-ring 42. In order to prevent torsional deformation of the O-ring, I have interposed the friction washer 44 between the shoulder 60 and the O-ring so that the friction washer 44 transmits only an axial force component to the O-ring. When the valve core 24 has been inserted into the valve stem 10 sufficiently far to form the static seal 68 the body 26 will be located in the reduced diameter bore 20 and the end of the compression spring 62 is seated against the shoulder 22. The spring 62 urges the frusto-conical portion 30 upwardly against the face of the O-ring 42 for forming the dynamic sealing surface 70. Furthermore, the upward force is transmitted to the screw plug 46 and acts to lock the plug in place against loosening. As has been mentioned, the O-ring is automatically self-aligning between the opposed tapered surfaces 18 and 30. A tight dynamic seal is always maintained because the pressurized gas within the pressure chamber assists the compression spring 62 in maintaining the dynamic seal by keeping the frusto-conical portion 30 in tight engagement with the O-ring. It should be noted that any sudden increase in pressure due to deformation of the tire increases the effectiveness of the dynamic seal by urging the body 26 upwardly as viewed in FIG. 2. My sealing means is also effective under low internal pressures in the pressure chamber due to the constant upward spring force.

In order to introduce pressurized gas into the pressure chamber it is merely necessary to depress the pin 34 for moving the frusto-conical portion 30 downwardly against the bias of the spring 62 and out of engagement with the O-ring 42 thus allowing the pressurized gas to pass through the openings 58, the axial bore 56, the O-ring inner diameter, and the axial grooves 28 into the pressure chamber, as shown by the arrows in FIG. 3. Passage of the pressurized gas at high speed over the surfaces of the frusto-conical portion and the corresponding sealing portion of the O-ring 42 insures that no dirt or grit particles will be present on these surfaces for impairing the dynamic sealing efficiency of my novel valve core. As I have eliminated all sharp sealing surfaces which seal upon a line and may deteriorate with extended use, no such deterioration of the sealing surface appears in my valve core. Softening of the rubber O-ring due to wear and high temperatures to which it is subjected allows the frusto-conical portion 30 to reseat itself by moving upwardly under the force of the internal pressure and the spring 62 thus increasing the area of the static and dynamic seals 68 and 70.

Having described my invention of an improved valve core it will be readily appreciated by those skilled in the art that a valve core embodying my invention is simple in design, low in cost and ingenious in operation. Reliabilty of operation was of primary concern, although ease of assembly and minimum cost of manufacture were also important considerations leading to the invention of my unique device.

It should be understood that the present disclosure has been made only by way of example and that numerous change in details of construction and the combination and arrangement of parts may be resorted to without departing from the true spirit and the scope of the inventory.

What I claim as new and desire to secure by Letters Patent of the United States is:

1. An improved valve which comprises: a valve stem having a first end communicating with the atmosphere and a second end communicating with a pressure chamber and defining therebetween a passageway having an internally threaded first portion at said first end, a second portion of smaller cross section at said second end, and a conically tapered portion therebetween; a substantially cylindrical valve core body positioned within the second portion of said passageway for reciprocation therein and having a conical valve seat at one end positioned within the tapered portion of said passageway and of an opposite taper therefrom; a central axial pin extending from said conical valve seat into the first portion of said passageway; a screw plug positioned within and threadedly engaging the first portion of said passageway defining an axial bore terminating in a reduced diameter central axial opening encircling said pin; a deformable sealing ring encircling said conical valve seat within the tapered portion of said passageway; and resilient biasing means at the other end of said valve core body biasing said valve seat against said sealing ring.

2. The improved valve defined in claim 1 wherein the inner diameter of said sealing ring is at least twice the diameter of said pin.

3. The improved valve defined in claim 1 further including a friction washer loosely encircling said pin and interposed between said screw plug and said sealing ring.

4. The improved valve defined in claim 1 wherein said cylindrical body includes a plurality of circumferentially spaced axially extending grooves defined therein to allow a faster flow of gas to pass said valve core.

5. The improved valve defined in claim 1 wherein said body includes a reduced diameter portion at said other end of said resilient biasing means includes a compression spring having a portion tightly encircling said reduced diameter portion for being secured thereto.

6. The improved valve defined in claim 2 further including a friction washer loosely encircling said pin interposed between said screw plug and said sealing ring, and an enlarged portion on said pin at its end remote from said body to retain said sealing ring, said friction washer and said screw plug.

7. The improved valve defined in claim 6 wherein said cylindrical body includes a plurality of circumferentially spaced axially extending grooves defined therein, and includes a reduced diameter portion at said other end, and said resilient biasing means includes a compression spring having a portion tightly encircling said reduced diameter portion for being secured thereto.

References Cited

UNITED STATES PATENTS

| | | | |
|---|---|---|---|
| 669,414 | 3/1901 | Hilton | 137—234.5 |
| 690,192 | 12/1901 | Schrader | 137—234.5 X |
| 1,050,491 | 1/1913 | Kraft | 137—234.5 |

FOREIGN PATENTS

| | | |
|---|---|---|
| 682,643 | 5/1930 | France. |
| 840,559 | 7/1960 | Great Britain. |
| 1,077,463 | 11/1954 | France. |

HAROLD W. WEAKLEY, Primary Examiner

U.S. Cl. X.R.

251—333, 361

PO-1050
(5/69)

UNITED STATES PATENT OFFICE
CERTIFICATE OF CORRECTION

Patent No. 3,480,035      Dated November 25, 1969

Inventor(s) Joseph J. Szanto

It is certified that error appears in the above-identified patent and that said Letters Patent are hereby corrected as shown below:

Column 2, line 1, "axail" should be --axial--.

See page 3, line 3, of specification as filed.

Column 4, line 5, "change" should be --changes--.

See page 7, line 25 of specification as filed.

Column 4, lines 7 and 8, "inventory" should be --invention--.

See page 7, line 27 of specification as filed.

Column 4, line 44, change "of" to --and--.

See claim 5, line 3 as originally filed.

Column 4, line 47, after "pin" insert --and--.

See amended claim 6, line 4.

SIGNED AND
SEALED
JUL 21 1970

(SEAL)
Attest:

Edward M. Fletcher, Jr.
Attesting Officer

WILLIAM E. SCHUYLER, JR.
Commissioner of Patents